(12) United States Patent
Tapler et al.

(10) Patent No.: US 9,229,649 B2
(45) Date of Patent: Jan. 5, 2016

(54) DEVICE FOR REMOTE DEFRAGMENTATION OF AN EMBEDDED DEVICE

(75) Inventors: Christoph Tapler, Gratkom (AT); Ernst Haselsteiner, Graz (AT)

(73) Assignee: NXP B.V., Eindhoven (NL)

( * ) Notice: Subject to any disclaimer, the term of this patent is extended or adjusted under 35 U.S.C. 154(b) by 2107 days.

(21) Appl. No.: 12/303,738

(22) PCT Filed: May 16, 2007

(86) PCT No.: PCT/IB2007/051871
§ 371 (c)(1),
(2), (4) Date: Dec. 6, 2008

(87) PCT Pub. No.: WO2007/141684
PCT Pub. Date: Dec. 13, 2007

(65) Prior Publication Data
US 2010/0262587 A1    Oct. 14, 2010

(30) Foreign Application Priority Data

Jun. 8, 2006 (EP) ..................... 06115173

(51) Int. Cl.
*G06F 12/00* (2006.01)
*G06F 17/30* (2006.01)
*G06F 3/06* (2006.01)
(Continued)

(52) U.S. Cl.
CPC .............. *G06F 3/0644* (2013.01); *G06F 3/061* (2013.01); *G06F 3/0679* (2013.01); *G06F 3/08* (2013.01); *G06F 12/023* (2013.01); *G06F 2206/1004* (2013.01)

(58) Field of Classification Search
USPC ................................... 707/813, 821
See application file for complete search history.

(56) References Cited

U.S. PATENT DOCUMENTS

| 5,933,653 A | 8/1999 | Ofek |
| 6,038,636 A * | 3/2000 | Brown et al. ................. 711/103 |
| 6,092,066 A | 7/2000 | Ofek |

(Continued)

FOREIGN PATENT DOCUMENTS

| DE | 10040241 A1 | 3/2001 |
| EP | 1046996 A1 | 10/2000 |
| WO | 2004/066153 A1 | 8/2004 |

OTHER PUBLICATIONS

Winternals Software; "Press Release—Defrag Manager—The Enterprise Ready, Clientless Defragger"; Jul. 15, 2002; Austin, Texas, US.
(Continued)

*Primary Examiner* — Robert Beausoliel, Jr.
*Assistant Examiner* — Michael Pham

(57) ABSTRACT

An embedded device (1) having a memory (2) that is organized to store both data objects (DO1-DOx) and meta data (MD) which describes the locations at which the data objects are stored in the memory (2), the embedded device (1) which is connectable to a remote defragmentation device (3) is disclosed. The embedded device (1) is adapted to transmit, at the request of the defragmentation device (3), the meta data (MD) and optionally the data objects (DO1-DOx) stored in the memory (2) to the defragmentation device (3) and, in accordance with instructions and data received from the defragmentation device (3), to update in its memory (2) the meta data (MD) and to store the data objects (DO1-DOx) at locations as defined in the updated meta data (MD).

19 Claims, 1 Drawing Sheet

(51) Int. Cl.
*G06F 3/08* (2006.01)
*G06F 12/02* (2006.01)

(56) References Cited

U.S. PATENT DOCUMENTS

| | | |
|---|---|---|
| 6,205,529 B1 | 3/2001 | Shagam |
| 6,317,815 B1 | 11/2001 | Mayer et al. |
| 6,885,395 B1 | 4/2005 | Rabbani et al. |
| 7,702,870 B2 * | 4/2010 | English et al. ................ 711/165 |
| 2003/0229752 A1 * | 12/2003 | Venkiteswaran ............. 711/103 |
| 2006/0221719 A1 * | 10/2006 | Maeda et al. ............ 365/189.05 |
| 2007/0118426 A1 * | 5/2007 | Barnes, Jr. ..................... 705/14 |
| 2009/0150633 A1 * | 6/2009 | Lee et al. ...................... 711/165 |

OTHER PUBLICATIONS

"Perfectdisk 2000"; Feb. 14, 2006; Hallogram Publishing; www.hallogram.com/pdisk/.

* cited by examiner

DEVICE FOR REMOTE DEFRAGMENTATION OF AN EMBEDDED DEVICE

FIELD OF THE INVENTION

The invention relates to an embedded device, a defragmentation device, a system for defragmentation of data objects in a memory of an embedded device and a method for remote defragmentation suitable to be performed on said system.

BACKGROUND OF THE INVENTION

Fragmentation is a term which is used in the context of file systems. Fragmentation occurs when objects (e.g. files) of different sizes are repeatedly created and deleted. If, for example, an object in a file system has been deleted and afterwards a new object is created, this object does not necessarily fit into the gap which emerged by the previous deletion. Typically, an Operating System (OS) will then split up the new object and fill up smaller gaps. Hence the file is fragmented. Fragmentation forces the Operating System to store meta data which maintains the link between the fragmented data and the memory locations. This leads to drawbacks like slow-down of file access due to handling of the meta data and file fragments by the OS, and loss of memory capacity due to stored meta data. The more meta data have to be maintained, the fewer payload data can be stored.

As a result, defragmentation tools have been developed for rich file systems such as FAT (File Allocation Table) or NTFS (New Technology File System) which take account of this problem. Defragmentation tools of this kind have direct access to hardware components such as like hard disks or other non-volatile data storage devices. Defragmentation applications sort data by shuffling the objects and storing them in one continuous memory chunk. However, this process needs many read/write processes, an effective sorting mechanism and also a significant amount of time.

Defragmentation tools of this kind are widely used in the PC world for storage devices, such as hard disks being incorporated into the computer device. However, such defragmentation applications are not commonly employed in smart card technology due to the fact that defragmentation algorithms are complex and therefore demand significant space on non-volatile memory of the smart card. However, it should be mentioned that there are some smart cards that are able to carry out defragmentation, e.g. so called "JavaCards". Besides, a smart card is usually only powered when it has to perform some service but not for maintenance operations. Thus, there is no time scheduled to perform such operations. Furthermore, the non-volatile memory of the card is irreversibly damaged when a certain number of write cycles is exceeded, since the number of cycles is limited to a few 100,000 operations.

From U.S. Pat. No. 6,885,395 B1 a method for selectively adjusting resolution levels or quality levels of digital images stored in a digital camera memory is known. As quality levels are reduced from previously stored images, the available memory becomes fragmented. To minimize the time required to store new images and to access these newly stored images, the memory card is defragmented by using defragmentation algorithms known from the art. If the memory card uses Flash EPROM memory, which is organized in memory sectors, those can be erased and rewritten in order to defragment the Flash EPROM card.

EP 1 046 996 B1, DE 100 40 241 A1 and WO 2004/066153 A1 disclose methods for on-card defragmentation of memory on a smart card.

OBJECT AND SUMMARY OF THE INVENTION

It is an object of the invention to provide an embedded device, a remote defragmentation device and a system for remote defragmentation of said embedded device, which are suitable to carry out a defragmentation algorithm outside the embedded device. Furthermore, it is an object of the present invention to provide a remote defragmentation method of said embedded device suitable to be executed on a remote defragmentation system according to the present invention.

According to the invention, an embedded device has a memory that is organized to store both data objects and meta data describing the locations at which the data objects are stored in the memory, wherein the embedded device is connectable to a remote defragmentation device. The embedded device is adapted to transmit, on request of the defragmentation device, the meta data and optionally the data objects stored in the memory to the defragmentation device, and, in accordance with instructions and data received from the defragmentation device, to update in its memory the meta data and to store the data objects at locations as defined in the updated meta data.

The advantage of the claimed system is the possibility to achieve optimal memory performance without stressing the internal capacities of the embedded device by separating the embedded device and the defragmentation device from each other, exporting the data objects and/or meta data to the remote defragmentation device and defragmenting the data outside the embedded device.

Further embodiments and advantages are apparent from dependent claims. According to one aspect of the invention, the memory is a non-volatile memory.

According to another aspect of the invention, the embedded device is configured as a smart card.

Advantageously, the embedded device is configured to transmit the meta data in response to a meta data request received from the defragmentation device, thus inhibiting the data to be read in unauthorized manner.

According to yet another aspect of the invention, the embedded device is configured to receive a data stream from the defragmentation device, which data stream contains the updated meta data and the data objects arranged according to the updated meta data and to write said data stream into the memory. This approach is simple and requests minimal resources both of communication and of the embedded device.

According to another aspect of the invention, the data stream is dumped as an image in the memory, thus avoiding new fragmentation of the data.

According to yet another aspect of the invention, the embedded device is configured to receive a list of meta data reorganizing instructions and/or data object relocating instructions from the defragmentation device and to reorganize the meta data and relocate the data objects according to said instructions, thus allowing an incremental defragmentation without exporting all data to the defragmentation device.

According to another aspect of the invention, a defragmentation device is disclosed comprising defragmentation means which are adapted to analyse the received meta data in respect of a state of defragmentation of the memory, to carry out a defragmentation algorithm on the meta data in the defragmentation device and to update the memory of the embedded device according to the defragmentation algorithm.

According to another aspect of the invention, the defragmentation means, in the course of carrying out the defragmentation algorithm, generate a list of meta data reorganizing instructions and/or data object relocating instructions and transmit said list of instructions to the embedded device for being processed in the embedded device, thus allowing to leave the data on the embedded device and to inhibit unauthorized use of the data.

According to yet another aspect in the defragmentation device according to the invention, the reorganizing instructions and/or data object relocating instructions are arranged for an incremental defragmentation of the memory, thus preventing the memory being corrupted even when the communication between the devices is interrupted during defragmentation, i.e. defragmentation can be resumed.

According to another aspect of the invention, the defragmentation device is adapted to read all data objects from the memory of the embedded device, wherein the defragmentation means are configured to reorganize the meta data received from the embedded device in accordance with the defragmentation algorithm and to generate a data stream containing the reorganized meta data and the data objects arranged according to the reorganized meta data and to transmit the data stream to the embedded device, this approach being simple and requesting minimal resources of communication and of the embedded device.

According to another aspect of the invention, the data stream is organized as an image of the content of the memory, thus avoiding new fragmentation of the data.

According to another aspect of the invention, a system for defragmentation of an embedded device is disclosed, wherein the embedded device and the defragmentation device are connectable to each other for exchange of data and instructions, thus allowing defragmentation whenever necessary.

According to yet another aspect of the invention, a method for remote defragmentation of an embedded device having a memory that is organized to store both data objects and meta data describing the locations at which the data objects are stored in the memory is disclosed, wherein the embedded device is connectable to a remote defragmentation device. The method comprises the steps of transmitting the meta data and optionally the data objects stored in the memory to the defragmentation device, carrying out a defragmentation algorithm on the meta data in the defragmentation device, and updating the memory of the embedded device according to the defragmentation algorithm of the defragmentation device.

According to another aspect of the invention, the defragmentation device sends meta data requests to the embedded device, and, in response to said meta data requests, the embedded device transmits the meta data to the defragmentation device, thus inhibiting the data to be read in unauthorized manner.

According to another aspect of the invention, in the course of carrying out the defragmentation algorithm, a list of meta data reorganizing instructions and/or data object relocating instructions is generated in the defragmentation device and is transmitted to the embedded device where it is processed, thus allowing an incremental defragmentation without exporting all data to the defragmentation device.

According to another aspect of the present invention, the reorganizing instructions and/or data object relocating instructions are arranged for an incremental defragmentation of the memory, thus preventing the memory being corrupted even when the communication between the devices is interrupted during defragmentation, i.e. defragmentation can be resumed.

According to yet another aspect of the invention, both the meta data and the data objects are transmitted from the memory of the embedded device to the defragmentation device and are reorganized in accordance with the defragmentation algorithm which is processed in the defragmentation device, wherein the defragmentation device generates a data stream containing the reorganized meta data and the data objects arranged according to the reorganized meta data and wherein the data stream is written back in the memory of the embedded device. This approach is advantageously simple and requests minimal resources of communication and of the embedded device.

According to another aspect of the invention, the data stream is organized as an image of the content of the memory and is dumped into the memory, thus preventing further fragmentation of the data.

The aspects defined above and further aspects of the invention are apparent from exemplary embodiments to be described hereinafter and are explained with reference to these exemplary embodiments.

The invention will be described in more detail hereinafter with reference to the exemplary embodiments. However, the invention is not limited to these embodiments.

DESCRIPTION OF EMBODIMENTS

Figure 1:
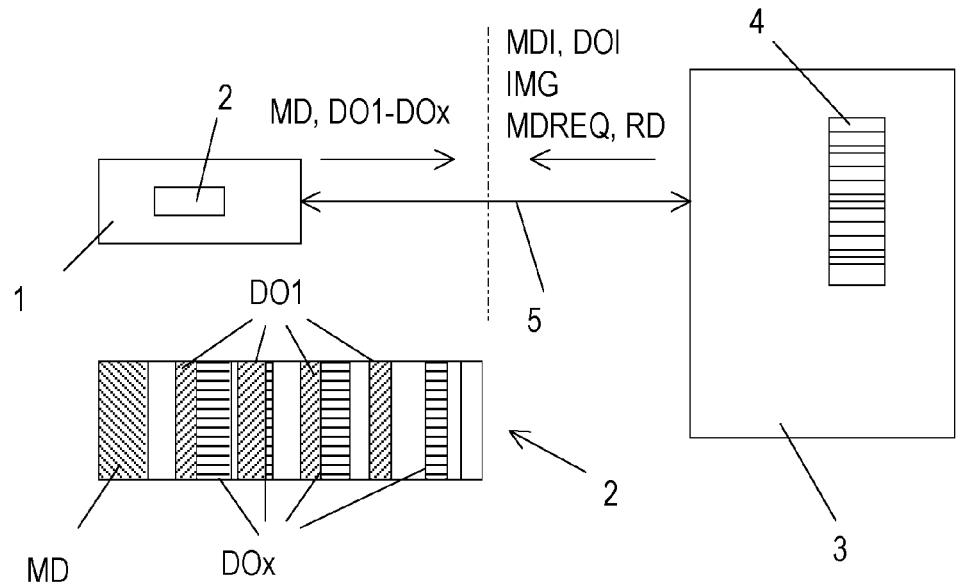
FIG. 1 shows a schematic view of a minimum embedded device, e.g. a smart card, with a remote defragmentation device according to the present invention.

FIG. 1 shows a schematic view of an embodiment of a minimum embedded device 1 with a memory 2. A typical field of application of minimum embedded devices 1 are smart cards. The invention is described with respect to such a smart card, but is not limited to this type of minimum embedded device 1.

As shown in FIG. 1, the storing structure in the memory 2 is complicated, fragmented data object information alternating with empty spaces. To defragment and thus optimize memory management and system performance, a remote defragmentation method of data objects (DO1-DOx) in the memory 2 of the minimum embedded device 1 is proposed. For this purpose, an external defragmentation device 3 being physically separated from the minimum embedded device 1 controls and executes the defragmentation process. To this end, defragmentation means 4, being configured to execute a defragmentation algorithm, are provided in the defragmenting device 3 whereby a defragmented arrangement of the data objects (DO1-DOx) is determined. "Remote" in the context of the present invention means that the algorithm is not executed on the minimum embedded device 1, but on another physically separated ("Remote") defragmentation device 3.

After the defragmentation process, the defragmented data objects (DO1-DOx) are transmitted from the external defragmenting device 3 back to the minimum embedded device 1. The normally large amount of free memory space of the external defragmenting device 3 is utilized to determine the defragmented arrangement of the data objects (DO1-DOx). This is different from the known defragmentation methods of hard disks which are incorporated in computer devices.

The connection between the embedded device 1 and the remote defragmentation device 3 can be performed by data communication means 5, for example in the form of a line or a wireless connection.

Meta data (MD) are requested from the memory 2 by a MDREQ or a RD request, the content of the memory 2 including fragmented data objects (DO1-DOx) is read and/or exported to the remote defragmentation device 3. After defragmentation, an image (IMG) of the data objects (DO1-DOx) and/or an image of the meta data (MDI) is written back to the embedded device 1.

The remote defragmentation can be realized in two different ways. On the one hand it is possible to house the defragmentation means 4 on the remote defragmenting device 3 and to export the data objects (DO1-DOx) to be defragmented to the remote defragmentation device 3, too. On the other hand, only the defragmentation means 4 can be accommodated on the remote defragmentation device 3 while the data objects (DO1-DOx) to be defragmented remain in the memory 2 of the embedded device 1.

The first approach (the defragmenting algorithm and the data objects (DO1-DOx) to be defragmented being present on the defragmentation device 3) performs all operations on the remote defragmentation device 3. Hence, all the data objects (DO1-DOx) are to be transferred from/to the remote defragmentation device 3. First, data objects (DO1-DOx) and metadata (MD, especially location information) are read from the non-volatile memory 2 of the minimum embedded device 1. Second, the defragmentation of the data objects (DO1-DOx) is carried out on the remote defragmentation device 3 by a defragmentation means 4 on the remote defragmentation device 3. While the defragmentation takes place, there is no interaction of the remote defragmentation device 3 with the minimum embedded device 1. Third, the defragmented data objects (DO1-DOx) are written back to the memory 2 of the minimum embedded device 1.

The first approach described above is a simple one because of the complete defragmentation being performed on the remote defragmentation device 3, thereby minimizing the complexity of communication between the minimum embedded device 1 and the remote defragmentation device 3. The amount of additional resources of the minimum embedded device 1 to be used is minimal. On the other hand, the defragmentation means 4 has to be aware of system internals of the memory 2 of the minimum embedded device 1. Besides, the memory 2 or even the whole embedded device 1 is at risk of being corrupted if the defragmentation process is interrupted. Attention should also be turned to security aspects, since all data objects (DO1-DOx) are accessible on the remote defragmentation device 3 during defragmentation.

The remote process with all data objects (DO1-DOx) exported to the remote defragmentation device 3 needs some functionality on the minimum embedded device 1, but the major functionality is located on the remote defragmentation device 3. This is preferred anyway, because remote defragmentation devices 3 are typically much more powerful than embedded devices 1. Moreover, the remote defragmentation device 3 can be updated more easily (e.g. because the defragmentation means 4 is optimized).

Figure 2:
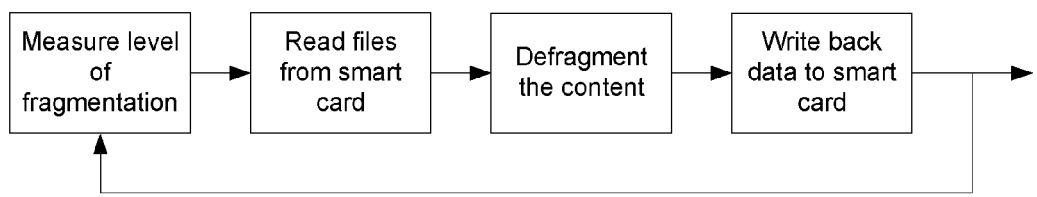
FIG. 2 shows a flowchart of a first method of remote defragmentation according to the present invention.

A flowchart of an exemplary inventive process according to a first method of defragmentation of the invention is shown in FIG. 2. The process comprises the following steps of:

Measuring a level of fragmentation: in this step, a function compares the degree of fragmentation to a predetermined threshold. If the level of fragmentation is too high, the process proceeds to the next step in the flowchart.

Reading data objects (DO1-DOx) from memory 2 of the minimum embedded device 1: this step has to be started by a special command (MDREQ). This is necessary because a simple Read( ) command would not convey meta data (MD) such as the physical location(s) or other meta data (MD).

Defragmentation of the content of the memory 2: since the data objects (DO1-DOx) including the meta data (MD) are now available on the defragmentation device 3, said device 3 can perform the defragmentation process without any interaction with the minimum embedded device 1, making the defragmentation process very fast and efficient.

Writing back data objects (DO1-DOx) to memory 2 of the minimum embedded device 1: the defragmented image (IMG) has now to be stored back in the memory 2. In order to avoid new fragmentation during the storage, the minimum embedded device 1 should provide some function which just dumps the image (IMG) to the non-volatile memory 2.

It should be mentioned, that the defragmentation methods according to the invention need not be carried out in one single, atomic process, but can be divided into a plurality of small tasks. Thereby, a suitable compromise between processing time and extent of defragmentation can be chosen.

The second approach splits the defragmentation means 4 from the data (i.e. only the algorithm is present on the defragmentation device 3). The algorithm is running on the defragmenation device 3, but the data objects (DO1-DOx) remain stored on the memory 2 of the minimum embedded device 1. The minimum embedded device 1 only provides the file structure including all the fragmentation information and meta data (MD).

This approach is roughly realized by proceeding through the following steps of: first reading the file structure (MD) from the memory 2 of the minimum embedded device 1, performing the defragmentation means 4 on the defragmentation device 3, generating a list of actions, and applying actions to data objects (DO1-DOx) in the memory 2 of the minimum embedded device 1.

By this process the defragmentation of the memory content can be performed incrementally. Only limited knowledge of the internals of the minimum embedded device 1 is needed. Besides, the data objects (DO1-DOx) to be defragmented are not visible to the defragmentation device 3 and therefore not available for unauthorized access. On the other hand, the communication and non-volatile memory 2 related actions are higher sophisticated than in the first method described previously. A significant set of functionality has to be provided by the minimum embedded device 1. However, the level of fragmentation might be higher compared to the first approach. The lifetime of the non volatile memory 2 could be reduced because shuffling a certain data object (DO1-DOx) may happen more than once.

The major difference from the first approach is that the data object (DO1-DOx) content of the memory 2 is left on the minimum embedded device 1 and only the defragmentation means 4 is provided by the remote defragmentation device 3. The minimum embedded device 1 has to provide only the underlying data structure (MD). The algorithm of the defragmentation means 4 is then applied to the data structure (MD). This leads to a sequence of actions (MDI, DOI) which are applied to the minimum embedded device 1. The defragmentation process can generally be interrupted without corrupting the minimum embedded device 1, and integrity of data is ensured.

Figure 3:
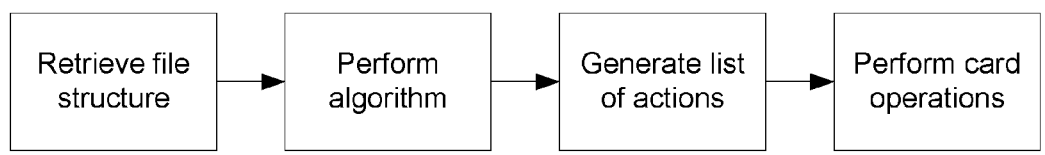
FIG. 3 shows a flowchart of second method of remote defragmentation according to the present invention.

A flowchart of an exemplary inventive process according to a second method of defragmentation of the invention is shown in FIG. 3. The process comprises the following steps of:

Retrieving file structure: only the file structure (MD) is needed, the content of the memory 2 will remain in the minimum embedded device 1.

Performing algorithm: the algorithm is performed on the data structure (MD). The optimization actions are transformed to commands (MDI, DOI) for the minimum embedded device 1 which have to be applied to it. The sequence can of course be optimized again in order to save unneeded move or copy procedures.

Executing the list of (optimized) actions (MDI, DOI).

The invention is not limited to smart cards but is applicable to a wide range of minimum embedded devices 1.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The words "comprising" and "comprises", and the like, do not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. An embedded device having
a memory circuit storing both data objects and meta data (MD) describing locations at which the data objects are stored in the memory circuit,
the embedded device configured and arranged to
connect to a remote defragmentation device, transmit, at a request of the defragmentation device, the meta data and the data objects stored in the memory circuit to the defragmentation device and,
in accordance with instructions and data received from the defragmentation device, update, in the memory circuit, the meta data and store the data objects at locations as defined in the updated meta data.

2. The embedded device according to claim 1, wherein the memory circuit is a non-volatile memory circuit.

3. The embedded device according to claim 1, wherein said embedded device is configured as a smart card.

4. The embedded device according to claim 1, wherein said embedded device is configured to transmit the meta data in response to a meta data request received from the defragmentation device.

5. The embedded device according to claim 1, wherein said embedded device is configured to receive a data stream from the defragmentation device, which data stream contains the updated meta data and the data objects arranged according to the updated meta data and to write said data stream into the memory circuit.

6. The embedded device according to claim 5, wherein the data stream is dumped as an image in the memory circuit.

7. The embedded device according to claim 1, wherein said embedded device is configured to receive a list of meta data reorganizing instructions and/or data object relocating instructions from the defragmentation device and to reorganize the meta data and relocate the data objects according to said instructions.

8. A defragmentation device configured and arranged to
connect to a remote embedded device having a memory circuit that is organized to store both data objects and meta data describing the locations at which the data objects are stored in the memory circuit,
send meta data requests to the embedded device,
receive the requested meta data,
analyse the received meta data in respect of a state of defragmentation of the memory circuit,
carry out a defragmentation algorithm on the meta data in the defragmentation device and
update the memory circuit of the embedded device according to the defragmentation algorithm.

9. The defragmentation device according to claim 8, wherein the defragmentation device is further configured and arranged to, in the course of carrying out the defragmentation algorithm, generate a list of meta data reorganizing instructions and/or data object relocating instructions and transmit said list of instructions to the embedded device for being processed in the embedded device.

10. The defragmentation device according to claim 9, wherein the reorganizing instructions and/or data object relocating instructions are arranged for an incremental defragmentation of the memory circuit.

11. The defragmentation device according to claim 8, wherein the defragmentation device is configured and arranged to read all data objects from the memory circuit of the embedded device, reorganize the meta data received from the embedded device in accordance with the defragmentation algorithm, generate a data stream containing the reorganized meta data and the data objects arranged according to the reorganized meta data and transmit the data stream to the embedded device.

12. The defragmentation device according to claim 11, wherein the data stream is organized as an image of the content of the memory circuit.

13. A system for defragmentation of an embedded device, comprising an embedded device and a remote defragmentation device,
the embedded device including
a memory circuit storing both data objects and meta data (MD) describing locations at which the data objects are stored in the memory circuit,
the embedded device configured and arranged to
connect to a remote defragmentation device,
transmit, at the request of the defragmentation device, the meta data and the data objects stored in the memory circuit to the defragmentation device and,
in accordance with instructions and data received from the defragmentation device, update, in the memory circuit, the meta data and to store the data objects at locations as defined in the updated meta data;
the remote defragmentation device configured and arranged to
connect to the embedded device,
send meta data requests to the embedded device and
receive the requested meta data,
analyse the received meta data in respect of a state of defragmentation of the memory circuit,
carry out a defragmentation algorithm on the meta data in the defragmentation device and
update the memory circuit of the embedded device according to the defragmentation algorithm.

14. A method for remote defragmentation of an embedded device having a memory that is organized to store both data objects and meta data describing the locations at which the data objects are stored in the memory, wherein the embedded device is connectable to a remote defragmentation device, the method comprising the steps of:

transmitting the meta data and the data objects stored in the memory in the defragmentation device;

carrying out a defragmentation algorithm on the meta data in the defragmentation device; and updating the memory of the embedded device according to the defragmentation algorithm of the defragmentation device.

15. The defragmentation method according to claim 14, wherein the defragmentation device sends meta data requests to the embedded device and, in response to said meta data requests, the embedded device transmits the meta data to the defragmentation device.

16. The defragmentation method according to claim 14, wherein, in the course of carrying out the defragmentation algorithm, a list of meta data reorganizing instructions and/or data object relocating instructions is generated in the defragmentation device and is transmitted to the embedded device where it is processed.

17. The defragmentation method according to claim 16, wherein the reorganizing instructions and/or data object relocating instructions are arranged for an incremental defragmentation of the memory.

18. The defragmentation method according to claim 14, wherein both the meta data and the data objects are transmitted from the memory of the embedded device to the defragmentation device and are reorganized in accordance with the defragmentation algorithm which is processed in the defragmentation device, wherein the defragmentation device generates a data stream containing the reorganized meta data and the data objects arranged according to the reorganized meta data and the data stream are written back in the memory of the embedded device.

19. The defragmentation method according to claim 18, wherein the data stream is organized as an image of the content of the memory and is dumped in the memory.

\* \* \* \* \*